(12) United States Patent
Currier et al.

(10) Patent No.: US 12,007,070 B1
(45) Date of Patent: Jun. 11, 2024

(54) PACKAGED OIL DELIVERY WITH INTEGRAL FLOW RESTRICTOR

(71) Applicant: Zulu Pods, Inc., Davie, FL (US)

(72) Inventors: Todd M. Currier, Davie, FL (US); Adam Smedresman, Davie, FL (US); Marios Soteriou, Davie, FL (US); Rob Sladen, Davie, FL (US); Jason Ferrante, Davie, FL (US)

( * ) Notice: Subject to any disclaimer, the term of this patent is extended or adjusted under 35 U.S.C. 154(b) by 58 days.

(21) Appl. No.: 17/750,534

(22) Filed: May 23, 2022

(51) Int. Cl.
| F16H 57/04 | (2010.01) |
| F16N 9/02 | (2006.01) |
| F16N 9/04 | (2006.01) |
| F16N 27/00 | (2006.01) |

(52) U.S. Cl.
CPC ............... *F16N 9/02* (2013.01); *F16N 9/04* (2013.01); *F16N 27/005* (2013.01); *F16N 2210/14* (2013.01)

(58) Field of Classification Search
CPC ............ F16N 9/02; F16N 9/04; F16N 27/005
See application file for complete search history.

(56) References Cited

U.S. PATENT DOCUMENTS

| 942,728 | A | * | 12/1909 | Jones | F16N 9/02 |
| | | | | | 384/387 |
| 1,166,985 | A | * | 1/1916 | Hayton | F16N 9/02 |
| | | | | | 384/392 |
| 1,355,266 | A | * | 10/1920 | Ricker | F16N 9/02 |
| | | | | | 415/168.3 |
| 1,364,647 | A | * | 1/1921 | Schwitzer | F16N 9/02 |
| | | | | | 384/393 |
| 1,370,422 | A | * | 3/1921 | Funk et al. | F16N 9/02 |
| | | | | | 384/373 |
| 1,982,021 | A | * | 11/1934 | Renfrew | F16N 27/005 |
| | | | | | 184/7.3 |
| 1,985,450 | A | * | 12/1934 | Holderfield | F16N 9/02 |
| | | | | | 384/286 |
| 2,021,400 | A | * | 11/1935 | Bennett | F16N 9/02 |
| | | | | | 384/393 |
| 2,077,880 | A | * | 4/1937 | Gits | F16N 7/366 |
| | | | | | 384/415 |
| 5,071,390 | A | * | 12/1991 | Latshaw | F16D 25/12 |
| | | | | | 464/7 |
| 8,579,512 | B2 | * | 11/2013 | Radinger | H02K 7/003 |
| | | | | | 384/473 |
| 9,188,215 | B2 | * | 11/2015 | Tage | F16H 57/0428 |
| 10,697,586 | B2 | * | 6/2020 | Poster | F02C 7/36 |

(Continued)

*Primary Examiner* — Michael A Riegelman
(74) *Attorney, Agent, or Firm* — Sanchelima & Associates, P.A.; Christian Sanchelima; Jesus Sanchelima

(57) ABSTRACT

A packaged oil delivery with integral flow restrictor including a dispenser assembly and a restriction assembly. The dispenser assembly includes a dispenser that is to be mounted on a mechanical system to enhance lubrication of gears, bearings, shafts, seals, and the like. As elements of mechanical systems often rotate at high/low RPM, the channels are intended to slow/expedite the speed in which oil is passively delivered onto the aforementioned components. The restriction assembly includes channels internally disposed within the dispenser to passively meter the flow of oil being expelled. The speed with which the oil is expelled from the inside of the dispenser is directly related to the length and pattern that the channel has.

27 Claims, 10 Drawing Sheets

(56) References Cited

U.S. PATENT DOCUMENTS

| | | | |
|---|---|---|---|
| 11,635,134 B1 * | 4/2023 | Currier | F16N 7/14 |
| | | | 184/6.4 |
| 11,808,309 B2 * | 11/2023 | Lewis | F16N 9/02 |
| 2014/0076661 A1 * | 3/2014 | Xu | F16H 57/0486 |
| | | | 184/14 |

* cited by examiner

PACKAGED OIL DELIVERY WITH INTEGRAL FLOW RESTRICTOR

BACKGROUND OF THE INVENTION

1. Field of the Invention

The present invention relates to a packaged oil delivery with integral flow restrictor and, more particularly, to a packaged oil delivery with integral flow restrictor that includes a dispenser that is mounted within rotational mechanisms of mechanical systems to provide a passive lubrication device.

2. Description of the Related Art

Several designs for flow restrictors have been designed in the past. None of them, however, include a dispenser capable of receiving oil therein with an integral restrictor consisting of a system of channels internally disposed for a precise control of oil flow rate from the inside to the outside of the dispenser. The channels are used to reduce pressure and flow rate, due to viscous friction forces and pressure forces exerted on the fluid during transport.

Applicant believes that a related reference corresponds to U.S. Pat. No. 10,697,586 issued for a supplemental lubrication pressurized by component or reservoir rotation. Applicant believes that another related reference corresponds to U.S. Pat. No. 9,188,215 issued for a lubrication structure for transmission. None of these references, however, teach of a dispenser with an integrated system of channels that follow a predetermined trajectory which, case depending, slow/expedite the flow rate in which oil is passively delivered onto mechanical systems. The system of channels permits to passively meter the flow of oil being expelled from the dispenser.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a packaged oil delivery with integral flow restrictor that includes a tortuous channel which follows a helical pattern and uses the length of the dispenser to increase the distance that the oil needs to travel before being expelled.

It is another object of this invention to provide a packaged oil delivery with integral flow restrictor which includes a dispenser with an integrated local restrictor. The local restrictor is a channel that follows a "switchback" pattern that can be customized to have a predetermined length, wherein the length is correlated with a desired amount of restriction that can be case dependent.

It is still another object of the present invention to provide a packaged oil delivery with integral flow restrictor which can combine the helical pattern with the switchback pattern if needed.

It is still another object of the present invention to provide a packaged oil delivery with integral flow restrictor that includes internal channels that can be sloped conically with reference to the longitudinal axis of the dispenser, defining an expanding helix, to promote flow due to centripetal acceleration from spin. This can also generate a distribution of acceleration along the length of the expanding helix, wherein the acceleration felt by the smaller diameter portion of the helix is going to be lower than the acceleration felt by the greater diameter portion.

One of the objects of the present inventions is to provide a solution that modulates the restriction of lubrication flow to provide the correct amount of lubricant depending on the application and/or machine being lubricated.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 10A is an internal sectional view of one embodiment of the dispenser 22 having at least one access port 41 and at least one plug 41a.

DETAILED DESCRIPTION OF THE EMBODIMENTS OF THE INVENTION

Figure 1:
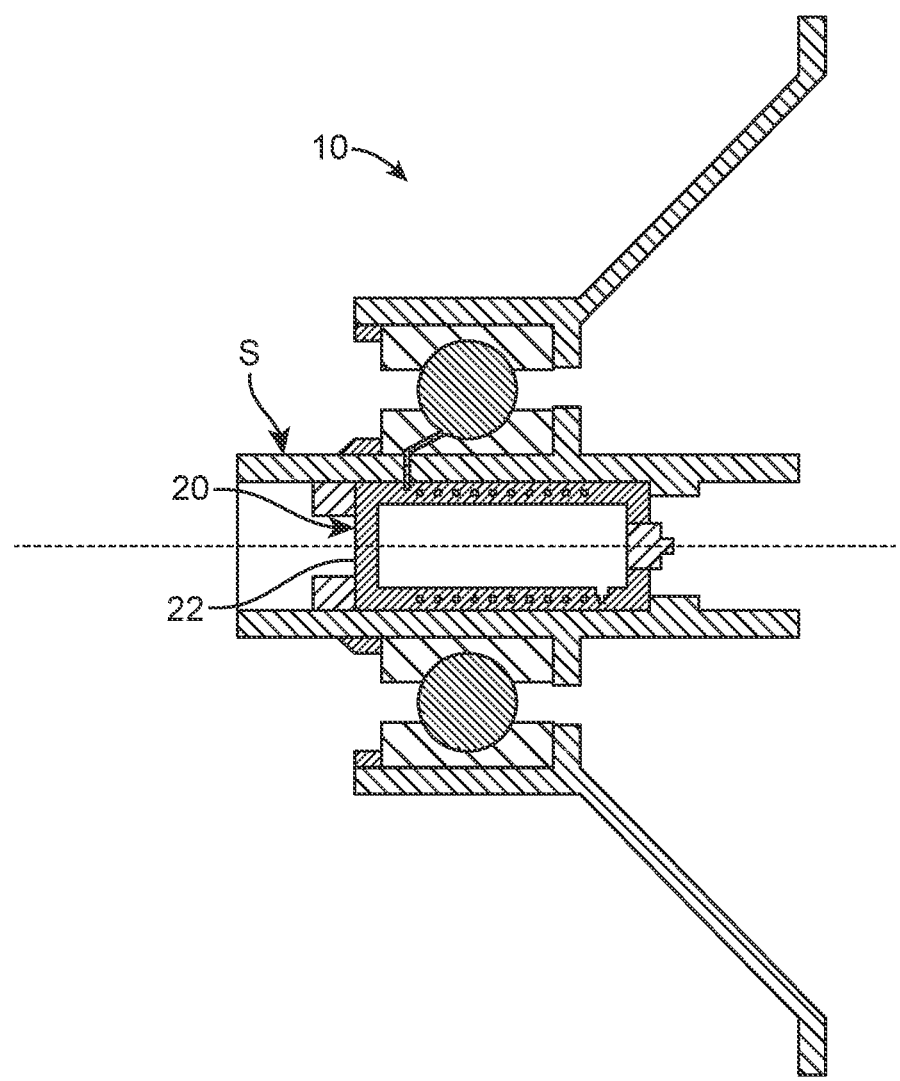
FIG. 1 represents a broken view of the present invention 10, wherein the dispenser 22 from the dispenser assembly 20 is located within a shaft from the mechanical system S.

Referring now to the drawings, where the present invention is generally referred to with numeral 10, it can be observed that it basically includes a dispenser assembly 20, and a restriction assembly 40. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Better shown in FIG. 1 the mechanical system S may be a system that interacts on mechanical principles. The mechanical system S may include gears, shafts, seals, bearings, or any other suitable element as known in the art. The mechanical system S may have a rotating and non-rotating configuration which depends on the type of elements that compose it. In a suitable embodiment, the mechanical system S may be part of an aircraft vehicle. Nonetheless, in other embodiments, the mechanical system S may be part of motor vehicles, watercraft vehicles, engines, electric motors, or the like. In one embodiment the mechanical system S may transfer motion without modifying the nature of it, defining a motion transmission system, whereas in another embodiment the mechanical system S may relay motion from one element to another while modifying the nature of the motion, defining a motion transformation system. When in motion, contact may occur between different elements of the mechanical system S causing the mechanical system to heat and, if it is not correctly lubricated, the mechanical system S may not work efficiently causing the system to fail due to lack of lubrication. The mechanical system S may also include elements that may rotate about a predetermined axis such as shafts, bearings, seals, and the like. Nonetheless, the mechanical system S may not be limited to the aforementioned components, as the mechanical system S may include non-rotating elements which may also need lubrication for optimal performance as known in the art. Depending on the purpose of the mechanical system, the aforementioned elements may rotate at high or low RPM. In these cases, the mechanical system S may require a lubrication system that may suit the condition in which different elements of the mechanical system S may operate.

The dispenser assembly 20 includes a dispenser 22. The dispenser 22 may be made of a resistant, sturdy, and durable material. In a suitable embodiment, the dispenser 22 may be made of an engineering material. Dispenser 22 may also display maintained strength and creep-rupture properties at high temperatures. In one embodiment, the dispenser 22 may be manufactured using additive manufacturing. In another embodiment, the dispenser 22 may be made using subtractive manufacturing. In yet another embodiment, the dispenser may be made of carbon steel, alloy steel, stainless steel, tool steel, brass, bronze, iron, aluminum, nickel-based alloy, ceramics, polymers, fibers, metal alloy, composite materials, or any variation or combination thereof. The dispenser may be volumetrically suitable to be attached to the mechanical system S to provide short-term lubrication by storing and dispensing a lubrication fluid. In a suitable embodiment the dispenser 22 may be designed to be mounted within rotational mechanisms of the mechanical system S as shown in FIG. 1. The dispenser 22 may be hollow. The dispenser 22 may have a cylindrical shape, nonetheless, in other embodiments, the dispenser may have a cuboid shape, a regular prism shape, an irregular prism shape, or any variations thereof. The dispenser 22 may have a predetermined length. The dispenser 22 may include a central portion 23 which may connect two distal ends. The central portion 23 may have an inner cross-section and a predetermined thickness. The dispenser 22 may include a reservoir 24. The reservoir 24 may be volumetrically suitable to receive a predetermined amount of oil or other lubricant fluids therein. The reservoir 24 may have a shape that conforms with the shape of the dispenser 22. However, in other embodiments, the reservoir 24 may have other suitable volumetric shapes. To access the reservoir 24, the dispenser 22 may include a fill valve 26 which may permit to introduce lubricant therein. The fill valve 26 may be located at a distal end of the dispenser 22. In another embodiment, the fill valve 26 may be located wheresoever on the dispenser as long as it allows access to the reservoir 24. The fill valve 26 may be a passive valve, or an active valve like a solenoid valve, a proportional flow valve, an electric valve, an analog valve, or any other suitable valve as known in the art. The dispenser 22 further includes an inlet 28 and an outlet 29. The inlet 28 may be disposed within said reservoir 24 and may allow the content of the reservoir 24 to enter inside the inner cross-section of the central portion 23 where the restriction assembly 40 may be located. In one embodiment the inlet 28 may be an entrance hole. In another embodiment, the inlet 28 may include a check valve, a relief valve, a solenoid valve, a centrifugally opened valve, an additional traditional (non-integral) restrictor as known in the art which may act in series with an integral restrictor, a rupture disk (known in the art as "burst" disc), or any combination or variation of the aforementioned components. In one embodiment the outlet 29 may be an exit hole. In another embodiment, the outlet 29 may include a check valve, a relief valve, a solenoid valve, a centrifugally opened valve, an additional traditional (non-integral) restrictor as known in the art which may act in series with an integral restrictor, a rupture disc (such as frustum reverse buckling disk), a thermal rupture disc/membrane that may melt at a predetermined temperature allowing lubricant fluid to flow therethrough, or any combination or variation of the aforementioned components. The lubricant that flows from the reservoir into the central portion through the inlet 28 may be then expelled to an exterior of the dispenser 22 through the outlet 29. The outlet 29 may be disposed on an exterior surface of the central portion 23. In one embodiment, the inlet 29 and the outlet may be located diametrically opposite to each other. Nonetheless, the disposition of the inlet 28 with respect to the outlet 29 may be case dependent. The rotation of components in the mechanical system S may supply centrifugal forces within the dispenser 22 providing centrifugal pressure to the lubricant fluid that may be stored within the reservoir 24. In another embodiment, in which the dispenser 22 may be attached to non-rotating mechanisms, the dispenser 22 may rely on pre-pressurization and/or gravity and/or other external pressure sources (such as from turbomachinery) to pressurize the lubrication fluid stored within the dispenser 22.

Figure 2:
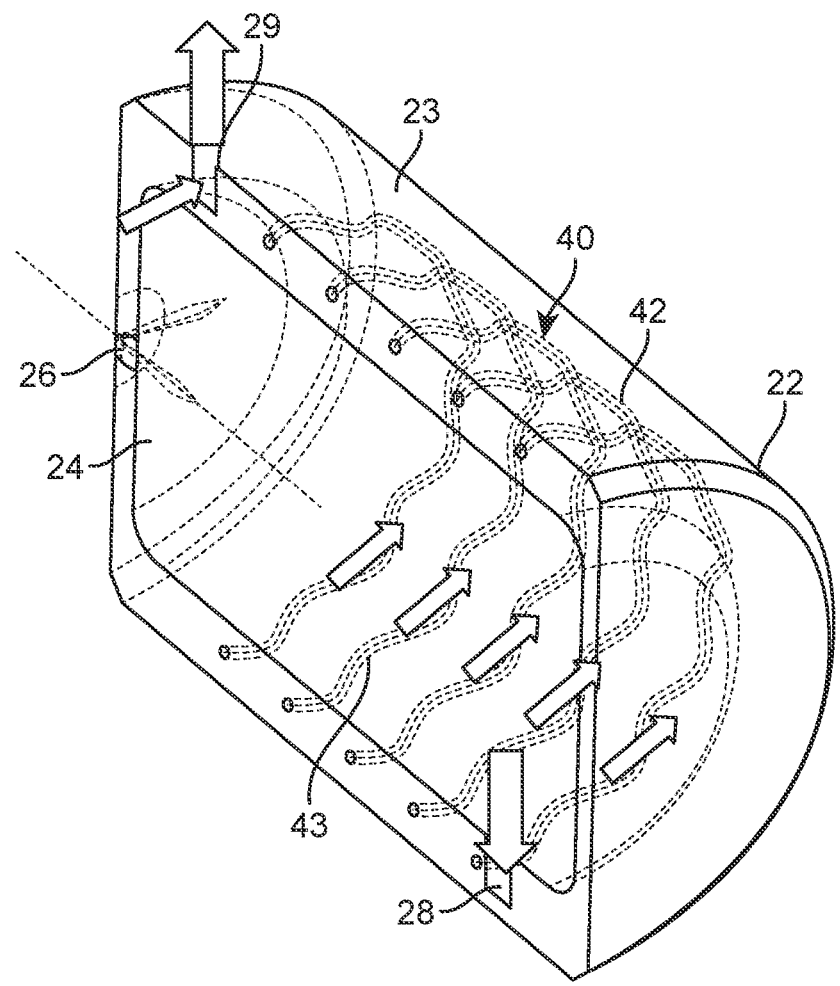
FIG. 2 shows an internal sectional view of the dispenser 22 having a reservoir 24, a fill valve 26. The restriction assembly 40 having a system of channels 42 in a helical configuration.
Figure 3:
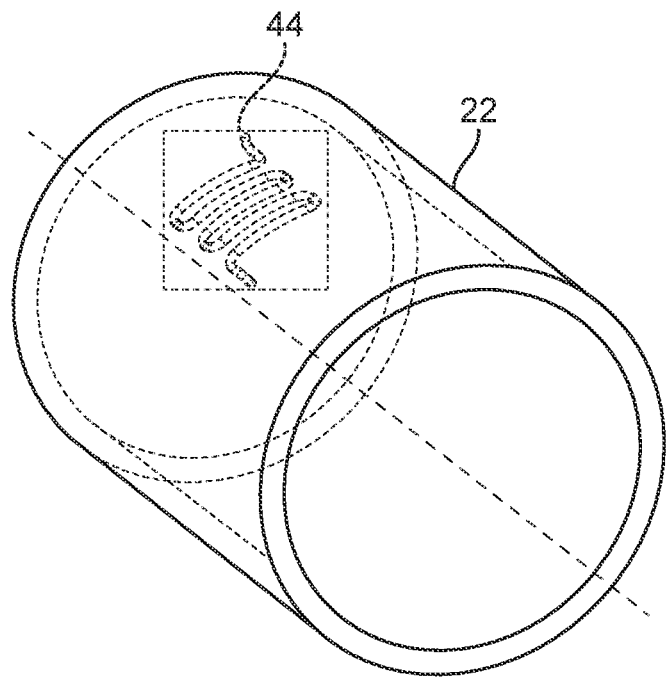
FIG. 3 illustrates a perspective internal view of the dispenser 22 having a local channel 44.
Figure 6:
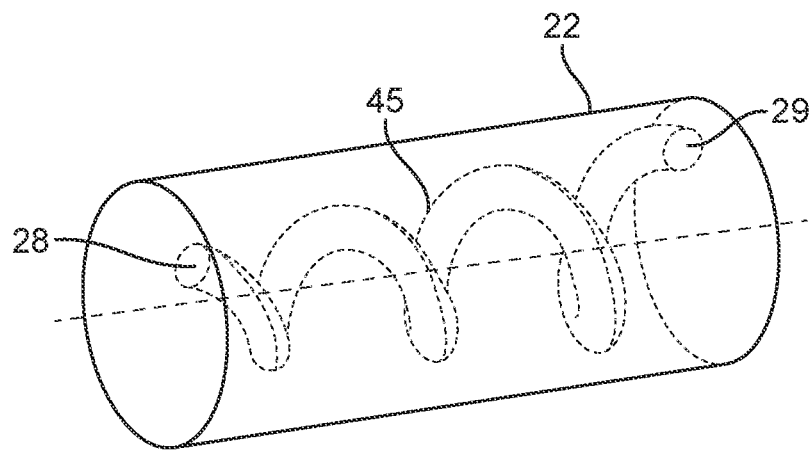
FIG. 6 represents a perspective internal view of the reservoir 22 having a conical channel 45.

The restriction assembly 40 includes a system of channels 42. In a suitable embodiment, the system of channels 42 may be volumetrically suitable to be disposed within an inner cross-section of the central portion 23 of said dispenser 22 as depicted in FIGS. 2, 3, and 6. Oil or any lubrication fluid contained within the reservoir 24 may flow through the system of channels 42. The system of channels 42 may exhibit a predetermined surface roughness that may affect the flow of the fluid therethrough. Given a predetermined surface roughness the friction felt at the wall by the fluid, the so-called Moody Friction Factor of the system of channels 42 may vary to present greater or lesser restriction. The material with which the system of channels 42 may be made as well as the surface roughness thereof, can be selected depending on the application that the present invention 10 may perform. The system of channels 42 may be used to passively meter oil, or any other suitable lubricant, out of the dispenser 22. The system of channels 42 may follow a tortuous path, meaning that the system of channels 42 include different configurations that may expedite or slow the speed in which oil may be passively delivered onto the mechanical system S. In alternative embodiments, the dispenser 22 may be formed of multiple pieces that are assembled together to form the system of channels 42.

Figure 8:
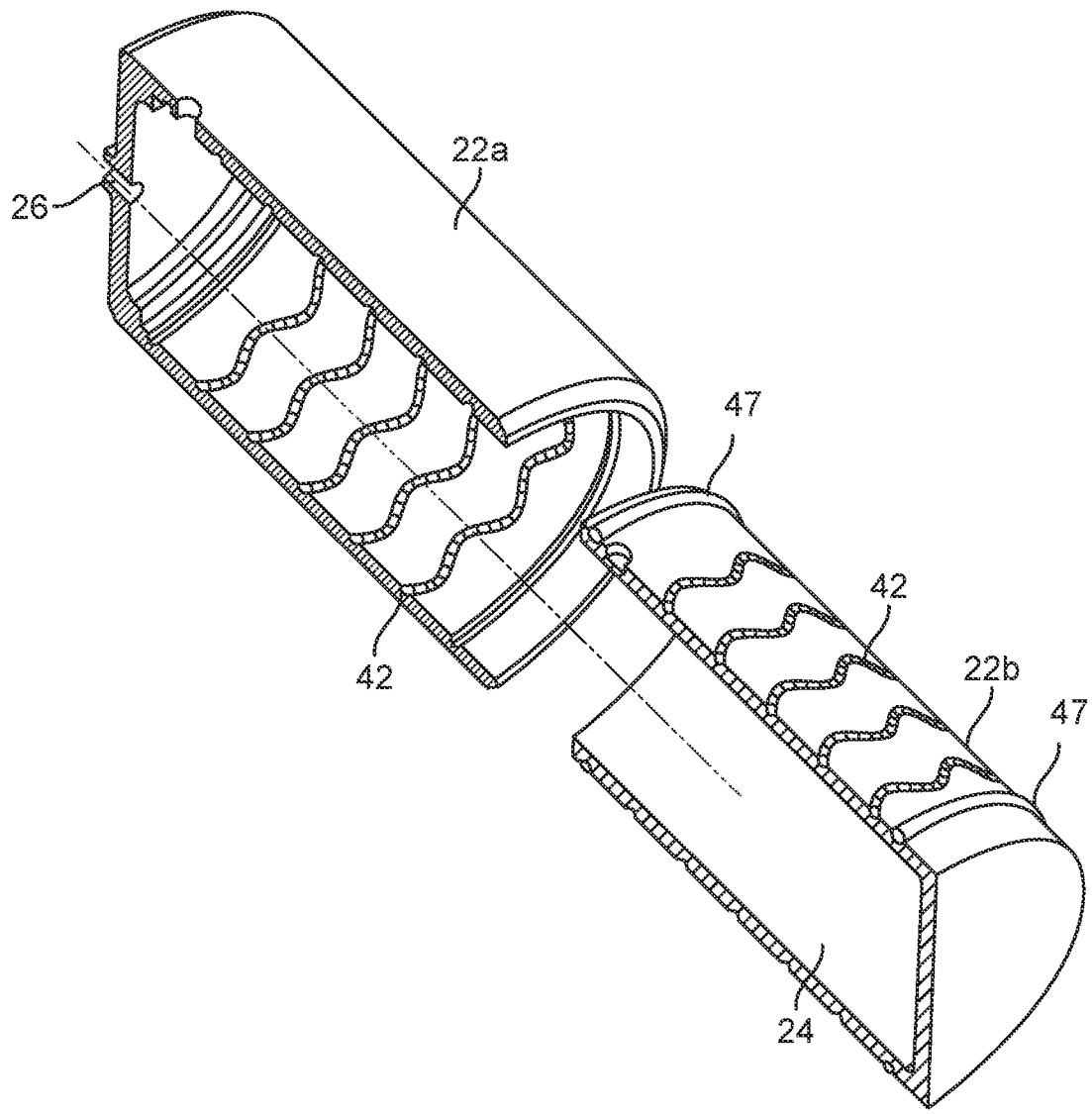
FIG. 8 is a representation of one embodiment of the dispenser 22 that includes an inner sleeve 22a and an outer sleeve 22b that when assembled together form the system of channels 42.
Figure 9:
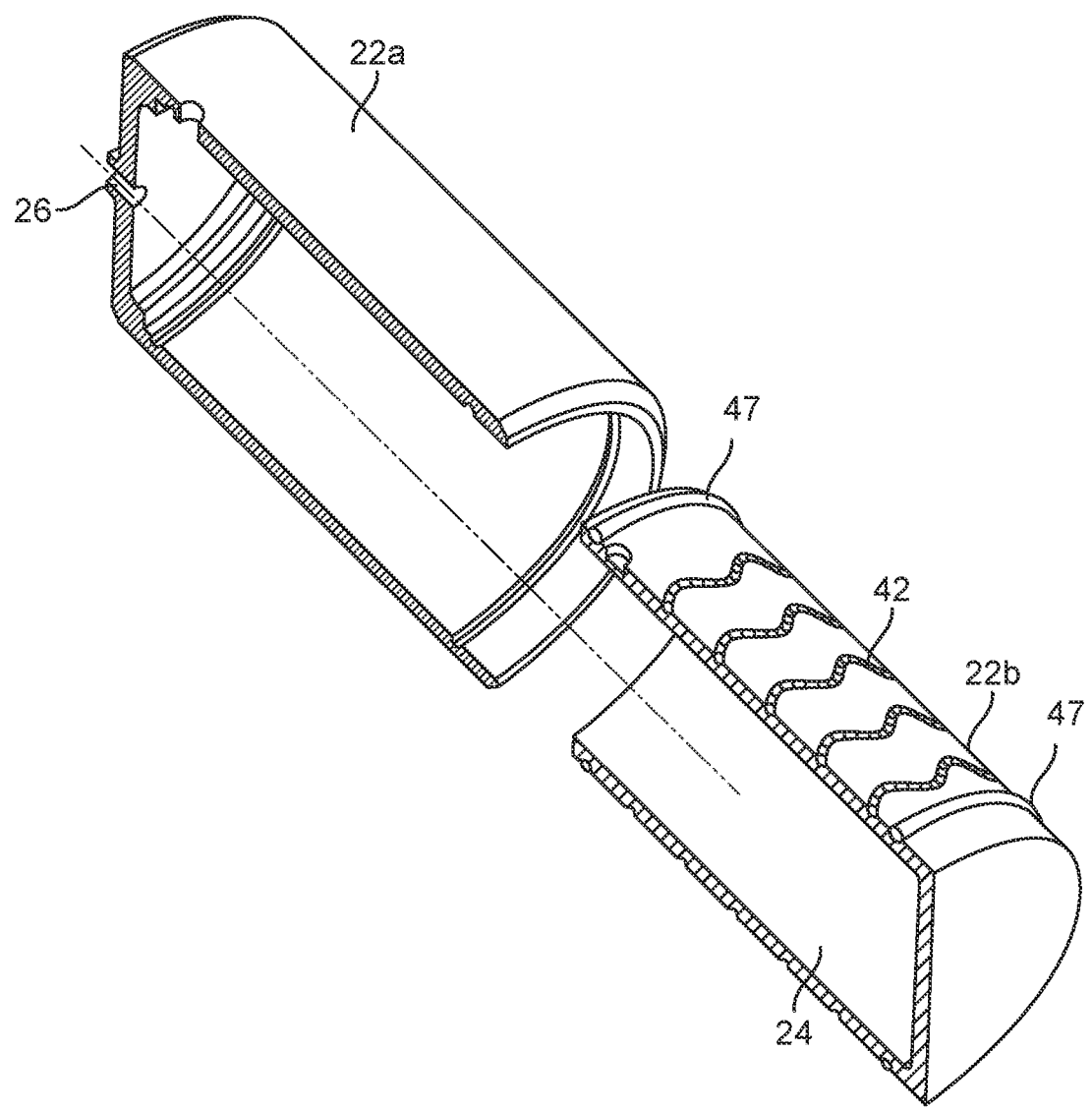
FIG. 9 shows one embodiment of the dispenser 22 that includes an inner sleeve 22a with the system of channels 42 thereon.
Figure 10A:
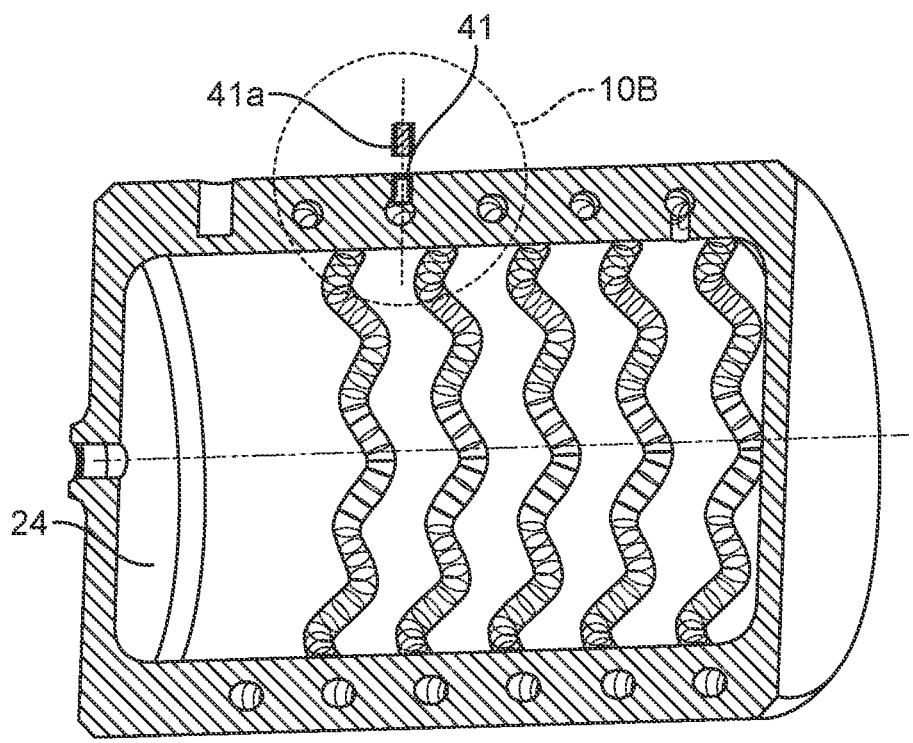
Figure 10B:
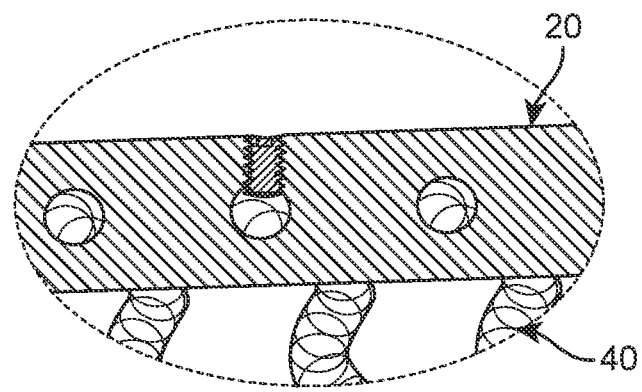
FIG. 10B depicts an enlarged view of the at least one plug 41a threaded inside the least one access port 41 to seal it.
Figure 10C:
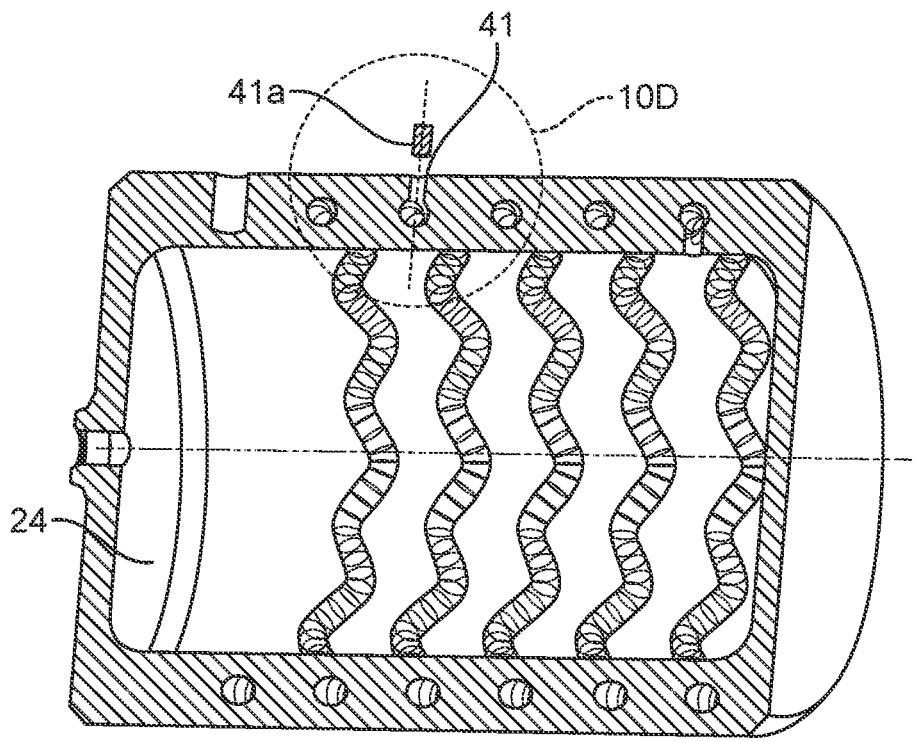
FIG. 10C shows an internal sectional view of one embodiment of the dispenser 22 including at least one access port 41 and at least one plug 41a FIG. 10D illustrates an enlarged view of the at least one plug 41a welded into the least one access port 41 to seal it.
Figure 10D:
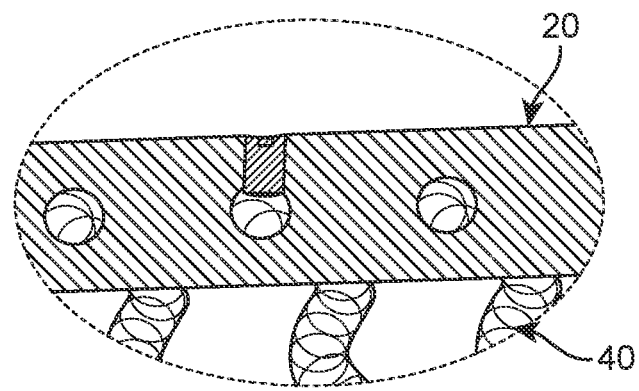

Referring now to FIGS. 8-10D it can be seen that in other embodiments, the system of channels 42 may be made using various methods including 3D printing and casting. FIG. 8 shows an alternative embodiment of the dispenser 22 wherein the dispenser 22 may be formed of an inner sleeve 22a and an outer sleeve 22b that slip into each other. In a suitable embodiment the system of channels 42 may be machined thereon, however, in other embodiments, the system of channels 42 may be formed using other methods known in the art such as casting, wire electrical discharge machining (EDM) or the like. Half of the system of channels 42 may be located about an external surface of the inner sleeve 22a, whereas the other half of the system of channels 42 may be located about an interior surface of the outer sleeve 22b. When fit together, half of channels disposed on the inner sleeve 22a may flush with the complementary half of the channels disposed on the outer sleeve 22b to form the complete system of channels 42, an o-ring seal 47 may be used to secure the sleeves together, nonetheless, other means for fastening may be used as known in the art. In another embodiment depicted in FIG. 9, the dispenser 22 may be formed by two sleeves wherein only the inner sleeve 22a may have the channels thereon. The external sleeve may be used to cover and seal the channels on the inner sleeve. As with the embodiment shown in FIG. 8, the present embodiment may use an o-ring seal 47 or other fastening means as known in the art to secure the sleeves together. In another embodiment, the system of channels 42 may have at least one access port 41 throughout the length thereof that may be separated by a predetermined distance from one another. The at least one access port 41 may be orthogonal to the system of channels 42 and may be used to access the interior of the channel 42 from outside of the dispenser 22. The at least one access port 41 may be used during the manufacturing process to facilitate cleaning out the system of channels 42, afterward at least one plug 41a may be used to seal the at least one access port 41. The at least one access port 41 may be volumetrically suitable to receive the at least one plug 41a therein. In one embodiment, shown in FIG. 10A, the at least one plug 41a may have an internal threaded portion and the at least one plug 41a may have an external threaded portion. FIG. 10B depicts an enclosed view of the present embodiment wherein the at least one plug 41a may be screwed into the at least one access port 41. In another embodiment, shown in FIG. 10C, the at least one access port 41 may have a plain interior surface just like the at least one plug 41a. FIG. 10D shows the at least one plug sealed via welding inside the at least one access port 41. It should be understood that the aforementioned methods for sealing are for explanatory purposes and that element 41a can be sealed therein using other suitable means as known in the art.

Best illustrated in FIG. 2, in one embodiment the system of channels 42 may follow a sinusoidal wave along the length of a helical pattern hereinafter collectively referred to as a helical channel 43. However, in another embodiment, the helical channel 43 may follow a pure helical path without additional wave forms. In yet another embodiment, the helical channel may follow a pure helical path summed with any other suitable waveform, be it a periodic or non-periodic waveform, to lengthen the helical channel 43 depending on given requirements. The helical channel 43 may be embedded into the central portion 23 and be wrapped around the circumference of the central portion 23. In the present embodiment, the helical channel 43 may use the length of the dispenser 22 to increase the distance that the oil needs to travel before being expelled. The helical channel 43 may include distal ends that may be connected to the inlet and the outlet (28, 29). The oil contained within the reservoir 24 may enter the helical channel 23 through the inlet 28 to then be expelled through the outlet 29.

Figure 4:
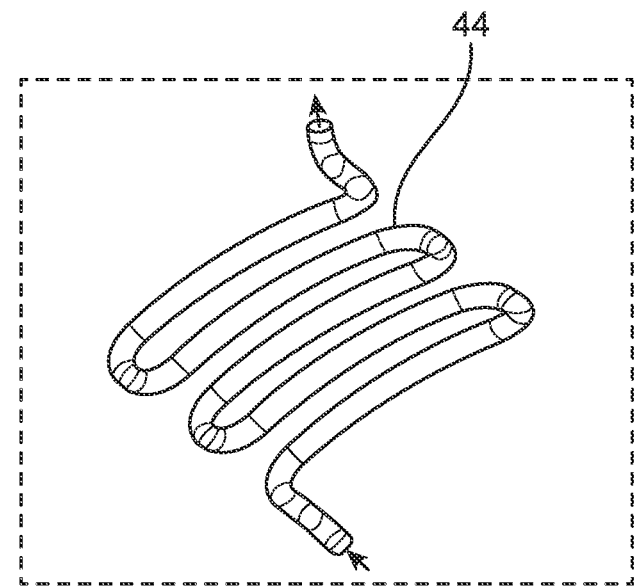
FIG. 4 is a representation of an enlarged view of the local channel 44 having a switchback pattern.
Figure 5:
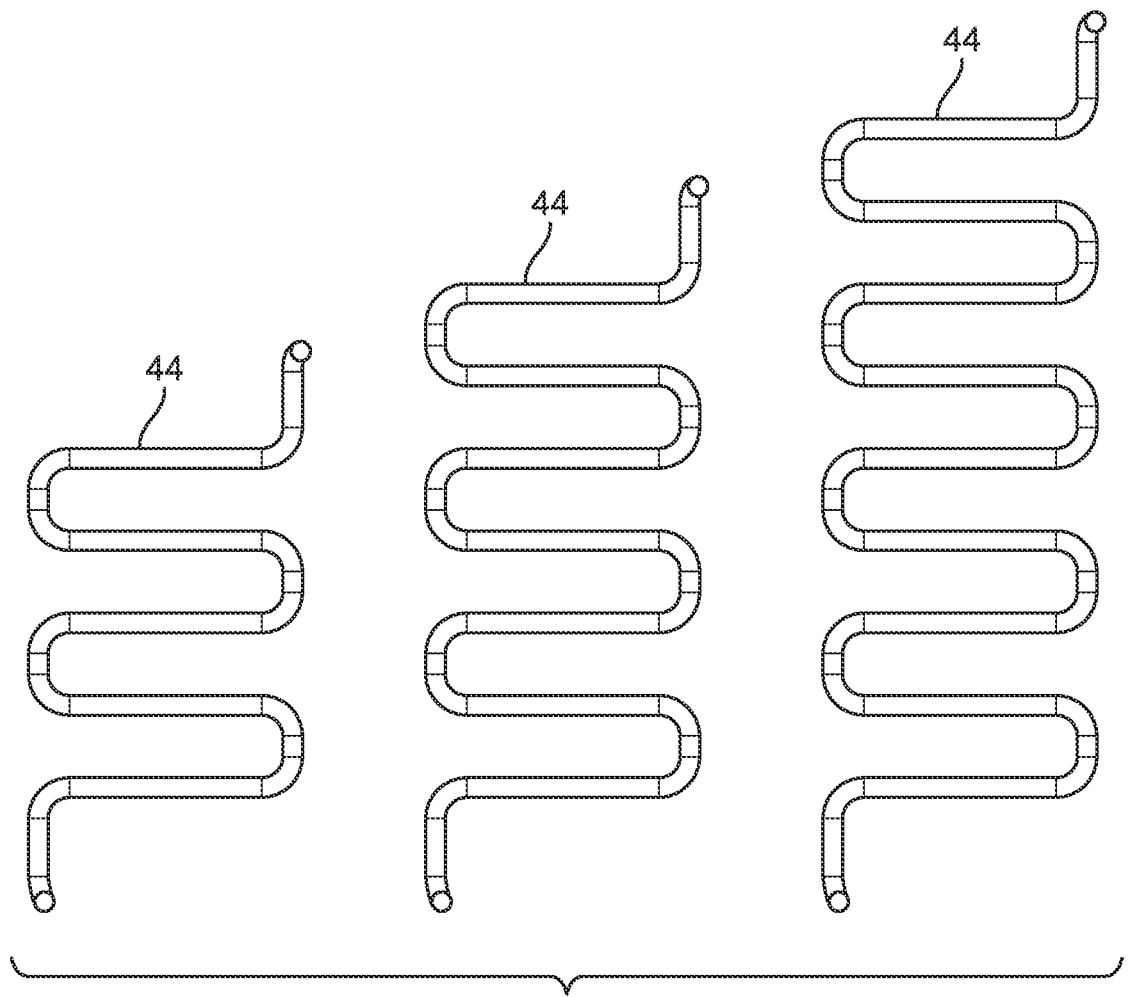
FIG. 5 illustrates a front view of the local channel 44 in alternative embodiments.

In another embodiment, the system of channels 42 may follow a series of turns, termed switchback pattern, defining a local channel 44. The system of channels 42 uses a switchback pattern to quantify the number of switchbacks so that a given amount of restriction is controlled and modulated by including a specified amount of switchbacks. The local channel 44 may present less restriction than the helical channel 43 as it may present a shorter distance that the oil needs to travel before being expelled than said helical channel 43. In one embodiment, the local channel 43 may cover a predetermined section of the central portion 23. FIG. 3 depicts a section of the central portion 23 with the local channel 44. The geometry is shown in more detail in FIG. 4. The local channel 44 may not necessarily require a complete revolution around the circumference of the central portion 23. Nonetheless, in another embodiment, the helical channel 43 and the local channel 44 may be combined if desired. The local channel 44 may be designed depending on desired requirements. For given parameters such as pipe diameter, bend height and width, or the like, a required local channel 44 may be designated by adding or removing a switchback as shown in FIG. 5.

As illustrated in FIG. 6, in another embodiment, the system of channels 42 may slope conically with reference to the longitudinal axis of the dispenser 22 defining a conical channel 45. The conical channel 45 may promote the flow due to centripetal acceleration from spin. Whereas the helical channel 43 and the local channel 44 may be intended to slow the speed in which oil may be delivered, the conical channel 45 may permit to expedite the oil delivery onto the mechanical system S. The conical channel may further accelerate the flow inside the central portion from the inlet 28 (oil entrance) to the outlet 29 (oil exit).

Figure 11:
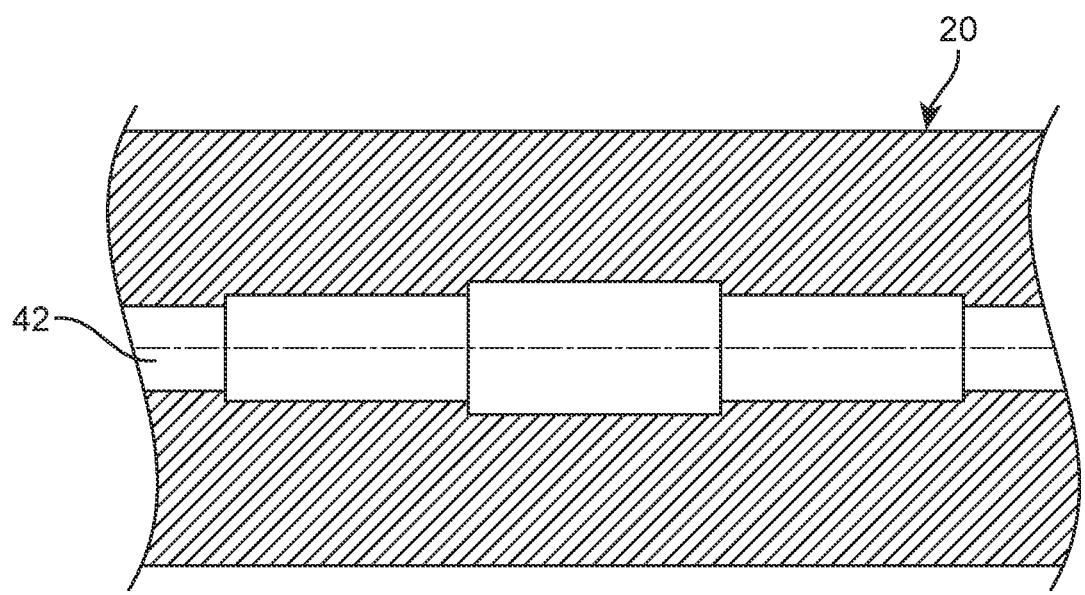
FIG. 11 shows a perspective cross sectional view of one embodiment of the dispenser 22 having the system of channels 42 wherein the system of channels 42 are diameter variable.

In another embodiment, the cross section (diameter) exhibited by the system of channels 42 may be customed to permit more flexibility to tune their restrictiveness. Upon the foregoing, the system of channels 42 may be diameter variable along their length as shown in FIG. 11.

In another embodiments, the system of channels 42 have a cylindrical section, a non-cylindrical section, or any suitable variation thereof as known in the art. It should be understood that the system of channels 42 used to restrict the flow of a lubrication fluid may present other suitable restrictive channel patterns/trajectories aside from the aforementioned (helical, switchback, conical patterns), such as winding patterns, regular patterns, irregular patterns, straight patterns, sinuous patterns, branched patterns, anastomosing patterns, multi-channel patterns, or any variation and/or combination thereof as known in the art. The aforesaid restrictive channel patterns/trajectories may use the entire length of the dispenser 22 or a predetermined section thereof.

Figure 7:
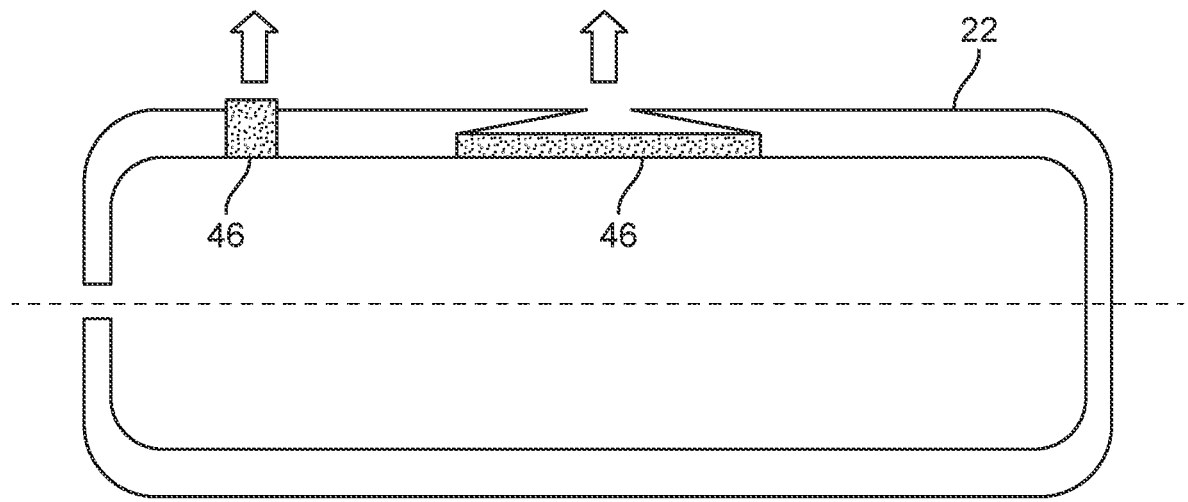
FIG. 7 is a broken view of the dispenser 22 having a porous medium 46 with predetermined geometries.

In another embodiment the restrictor assembly 40 may include a porous medium 46 that may internally connect the inlet and the outlet (28,29), wherein the inlet 28 and the outlet 29 may be aligned along the same axis which may be orthogonal to the reservoir and may be concentric to form a single opening that permits the lubrication fluid stored within the reservoir to be expelled. Nonetheless, it may be possible for the inlet 28 and the outlet 29 to be aligned along a diagonal axis, or any other suitable variation thereof. In one embodiment, the porous medium 46 may be integral to the dispenser 22, in another embodiment, the porous medium 46 may be a modular component. Said porous medium 46 may be disposed thereat. Porous medium 46 may exhibit features such as permeability, cross sectional area, length, among others. Flowrate and pressure drop across the porous medium 46 may be controlled by the aforementioned features of the medium 46. FIG. 7 illustrates two embodiments of the geometry of the porous medium 46. The porous medium 46 may offer a structure with customized permeability that permits to further restrict the flow of oil. Porous medium 46 may act to filter out contaminants from the lubrication fluid and the dispenser. Porous medium 46 may have a circular shape, a rectangular shape, a quadrangular shape, a regular shape, an irregular shape, or any variation or combination thereof. In a suitable embodiment, the porous medium 46 may be analytically designed to deliver a predetermined permeability. Nonetheless, in another embodiment, the structure of the medium 46 may be irregular and the permeability can be empirically defined. At a bottommost end of the porous medium 46 which may be proximal to the reservoir, the porous medium 40 may include a check valve, a relief valve, a solenoid valve, a centrifugally opened valve, an additional traditional (non-integral) restrictor as known in the art which may act in series with an integral restrictor, a rupture disk (known in the art as "burst" disc), or any combination or variation of the aforementioned components (not explicitly shown). At a uppermost end of the porous medium 46 which may be proximal to the dispenser exterior, the porous medium 46 may include a check valve, a relief valve, a solenoid valve, a centrifugally opened valve, an additional traditional (non-integral) restrictor as known in the art which may act in series with an integral restrictor, a rupture disc (such as frustum reverse buckling disk), a thermal rupture disc/membrane that may melt at a predetermined temperature allowing lubricant fluid to flow therethrough, or any combination or variation of the aforementioned components (not explicitly shown). The porous medium 46 in combination with the aforesaid elements may permit to tune the restriction that the medium 46 may exhibit.

The present invention seeks to modulate the passive flow of lubricant to a machine or system. The present invention provides prescribed amount of lubrication fluid to be delivered and provides boundary conditions of a problem.

Different Machines require different rates of lubricant to be delivered so as to not waste lubricant and so as to provide sufficient lubricant. The present invention through its various embodiments defines predetermined trajectories that allow for the flow rate of lubricant to be controlled.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A packaged oil delivery with integral flow restrictor, comprising:
 a dispenser assembly including a dispenser having a reservoir to store a lubrication fluid therein enclosed by a central portion thereof, the dispenser has an inlet located within the reservoir and an outlet located on an exterior surface of the central portion, the dispenser is attached to a mechanical system; and
 a restriction assembly including a system of channels located within a cross-section of the central portion wherein the system of channels connects said inlet to said outlet, the system of channels following a trajectory extending within the cross-section of the central portion;
 lubrication fluid travels from the inlet to the outlet through the system of channels, thereby reducing pressure and flow rate of the lubrication fluid.

2. The packaged oil delivery with integral flow restrictor set forth in claim 1, wherein said dispenser includes a fill valve, said fill valve permits to enter said lubrication fluid into said reservoir, said fill valve is a passive valve or an active valve.

3. The packaged oil delivery with integral flow restrictor set forth in claim 1, wherein said system of channels is a helical channel that follows a helical path, the helical channel is embedded into said inner cross-section of the central portion and follows a helical pattern around a circumference of the central portion, the helical channel is internally connected to the inlet and the outlet at distal ends.

4. The packaged oil delivery with integral flow restrictor set forth in claim 3, wherein said helical path is further combined with a sinusoidal wave along a length of the helical path.

5. The packaged oil delivery with integral flow restrictor set forth in claim 1, wherein the system of channels follows a sinusoidal path having a constant diameter.

6. The predetermined trajectory of claim 1 defined by a sinusoidal path having a variable diameter.

7. The packaged oil delivery with integral flow restrictor set forth in claim 1, wherein the system of channels follows a sinusoidal path having an adjustable length.

8. The packaged oil delivery with integral flow restrictor set forth in claim 1, wherein the system of channels follows a helical pattern that modulates the flow rate of a given lubricant by altering the pitch of the helical channel, said pitch defined by a number of revolutions per axial length.

9. The packaged oil delivery with integral flow restrictor set forth in claim 1, wherein the system of channels follows a helical pattern having helixes of varying diameters based on the flow rate of lubricant sought to be achieved.

10. The predetermined trajectory of claim 1 defined by a helical pattern having a channel with varying diameters throughout its path.

11. The packaged oil delivery with integral flow restrictor set forth in claim 1, wherein said predetermined trajectory uses a switchback pattern to quantify the number of switchbacks so that a given amount of restriction is controlled and modulated by including a specified amount of switchbacks, the switchback pattern defines a local channel that is internally connected to the inlet and the outlet at distal ends.

12. The predetermined trajectory of claim 1 using switchbacks that have a constant diameter per axial length of said dispenser.

13. The predetermined trajectory of claim 1 using switchbacks that have variable diameter per axial length of said dispenser.

14. The predetermined trajectory of claim 1 wherein switchbacks have arc lengths that are constant.

15. The predetermined trajectory of claim 1 wherein switchbacks have arc lengths that are variable.

16. The packaged oil delivery with integral flow restrictor set forth in claim 1, wherein said system of channels slopes conically with reference to a longitudinal axis of the dispenser defining a conical channel, said conical channel promotes a flow of said lubrication fluid when passing therethrough due to centripetal acceleration from a spin.

17. The packaged oil delivery with integral flow restrictor set forth in claim 1, wherein said restrictor assembly further includes a porous medium internally connects said inlet and said outlet, said porous medium offers a structure with customized permeability that restricts the flow of the lubrication fluid when passing therethrough, said porous medium filters out contaminants present in said lubrication fluid.

18. The packaged oil delivery with integral flow restrictor set forth in claim 1, wherein said predetermined trajectory of said system of channels follows restrictive channel patterns.

19. The packaged oil delivery with integral flow restrictor set forth in claim 1, wherein said dispenser is formed by an inner and an outer sleeve that slip into each other, wherein each sleeve has a predetermined section of the internal channels thereon, when assembled together the sleeves form the system of channels.

20. The packaged oil delivery with integral flow restrictor set forth in claim 1, wherein said system of channels include at least one access port that is disposed along said system of channels, the at least one access port permits to access form the exterior of the dispenser to an interior of the system of channels, said at least one access port is further sealed with an at least one plug.

21. The packaged oil delivery with integral flow restrictor set forth in claim 1, wherein said mechanical system includes rotational and non-rotational elements.

22. A packaged oil delivery with integral flow restrictor, comprising:
   a dispenser assembly including a dispenser, said dispenser having a reservoir to store a lubrication fluid therein, wherein the reservoir is enclosed by a central portion, the dispenser is attached to a mechanical system, wherein said mechanical system includes rotating and non-rotating elements, the dispenser includes an inlet disposed within the reservoir and an outlet disposed on an external surface of the central portion, the dispenser having a fill valve internally connected with said reservoir; and
   a restriction assembly including a system of channels located within a cross-section of the central portion, wherein the system of channels connects said inlet to said outlet, lubrication fluid flows from said inlet to said outlet through the system of channels, wherein the system of channels increases a distance that the lubrication fluid travels before being expelled, the system of channels follows restrictive channel patterns, the system of channels include at least one access port for cleaning said system of channels, the at least one access port is then sealed by at least one plug, the system of channels disposed within the dispenser passively meter a flow of said lubrication fluid when traveling from the inlet to the outlet; wherein said system of channels reduces pressure and flow rate of the lubrication fluid due to viscous forces and pressure forces exerted on the lubrication fluid during transport.

23. The packaged oil delivery with integral restrictor of claim 22, wherein said system of channels is a helical channel.

24. The packaged oil delivery with integral restrictor of claim 22, wherein said system of channels follow a series of turns, termed switchback pattern, defining a local channel.

25. The packaged oil delivery with integral flow restrictor set forth in claim 22, wherein said system of channels slopes conically with reference to a longitudinal axis of the dispenser defining a conical channel.

26. The packaged oil delivery with integral flow restrictor set forth in claim 22, wherein said restrictor assembly further includes a porous medium disposed in the outlet and/or in the inlet, said porous medium offers a structure with customized permeability that restricts the flow of the lubrication fluid when passing therethrough, said porous medium filters out contaminants present in said lubrication fluid.

27. A packaged oil delivery with integral flow restrictor, comprising:
   a dispenser assembly including a dispenser, said dispenser having a reservoir a reservoir to store a lubrication fluid therein enclosed by a central portion thereof, the dispenser has an inlet located within the reservoir and an outlet located on an exterior surface of the central portion, the dispenser is attached to a mechanical system wherein said mechanical system has a rotating and non-rotating configuration, the dispenser having a fill valve internally connected with said reservoir, said fill valve is a passive and/or an active valve; and
   a restriction assembly including a system of channels internally disposed within an inner cross-section of the central portion, wherein lubrication fluid flows from said inlet to said outlet through the system of channels, wherein the system of channels increases a distance that the lubrication fluid travels before being expelled through the outlet, the system of channels follow restrictive channel patterns, the system of channels include at least one access port for cleaning said system of channels, the at least one access port is then sealed by at least one plug, the system of channels disposed within the dispenser passively meter a flow of said lubrication fluid when traveling from the inlet to the outlet through the system of channels;
   wherein said restriction assembly further includes a porous medium that connects said inlet with said outlet, said porous medium offers a structure with customized permeability that restricts the flow of the lubrication fluid when passing therethrough, said porous medium filters out contaminants present in said lubrication fluid.

* * * * *